(12) United States Patent
Junkers

(10) Patent No.: US 12,017,311 B2
(45) Date of Patent: Jun. 25, 2024

(54) APPARATUS FOR TIGHTENING THREADED FASTENERS

(71) Applicant: HYTORC Division UNEX Corporation, Mahwah, NJ (US)

(72) Inventor: Eric P. Junkers, Hoboken, NJ (US)

(73) Assignee: HYTORC Division UNEX Corporation, Mahwah, NJ (US)

( * ) Notice: Subject to any disclaimer, the term of this patent is extended or adjusted under 35 U.S.C. 154(b) by 803 days.

(21) Appl. No.: 16/960,244

(22) PCT Filed: Sep. 2, 2018

(86) PCT No.: PCT/US2018/049293
§ 371 (c)(1),
(2) Date: Jul. 6, 2020

(87) PCT Pub. No.: WO2019/156712
PCT Pub. Date: Aug. 15, 2019

(65) Prior Publication Data
US 2021/0069839 A1 Mar. 11, 2021

Related U.S. Application Data

(63) Continuation-in-part of application No. PCT/US2017/020498, filed on Mar. 2, 2017.

(60) Provisional application No. 62/626,776, filed on Feb. 6, 2018, provisional application No. 62/302,260, filed on Mar. 2, 2016.

(51) Int. Cl.
*B23P 19/06* (2006.01)
*B25B 23/145* (2006.01)
*B25B 23/147* (2006.01)

(52) U.S. Cl.
CPC ........ *B23P 19/066* (2013.01); *B25B 23/1456* (2013.01); *B25B 23/147* (2013.01)

(58) Field of Classification Search
CPC . B23P 19/066; B25B 23/1456; B25B 23/147; B25B 21/00; B25B 23/145; B25B 23/0085
See application file for complete search history.

(56) References Cited

U.S. PATENT DOCUMENTS

| | | | |
|---|---|---|---|
| 11,660,734 B2 * | 5/2023 | Junkers | B25B 21/00 81/469 |
| 2003/0009262 A1 * | 1/2003 | Colangelo, III | B25B 23/145 700/275 |
| 2012/0090864 A1 * | 4/2012 | Junkers | B25B 23/0078 173/217 |

FOREIGN PATENT DOCUMENTS

| | | | | |
|---|---|---|---|---|
| CN | 108367417 B | * | 9/2020 | B25B 23/147 |
| EP | 1852760 A1 | * | 11/2007 | B25B 21/00 |

* cited by examiner

*Primary Examiner* — Francis C Gray
(74) *Attorney, Agent, or Firm* — Justin B. Bender, Esq.

(57) ABSTRACT

The present invention relates to an operation parameter regulation unit (50) for use with a bolting system having a plurality of networked electrically powered torque tools (10, 11) and/or drive portions of torque tools (10, 11) for simultaneous tightening of industrial threaded fasteners (40), the operation parameter regulation unit (50) including: a processing unit (53); an output unit (51) an input unit (52) an activation unit (55) for activating operation units and/or drive portions of torque tools (10, 11); and a control unit (54) for controlling operation parameters (41) of each of the plurality of networked electrically powered torque tools (10, 11) and/or drive portions of torque tools (10, 11) to maintain a difference between the operation parameters (41) within a predetermined value.

28 Claims, 5 Drawing Sheets

Figure 1:
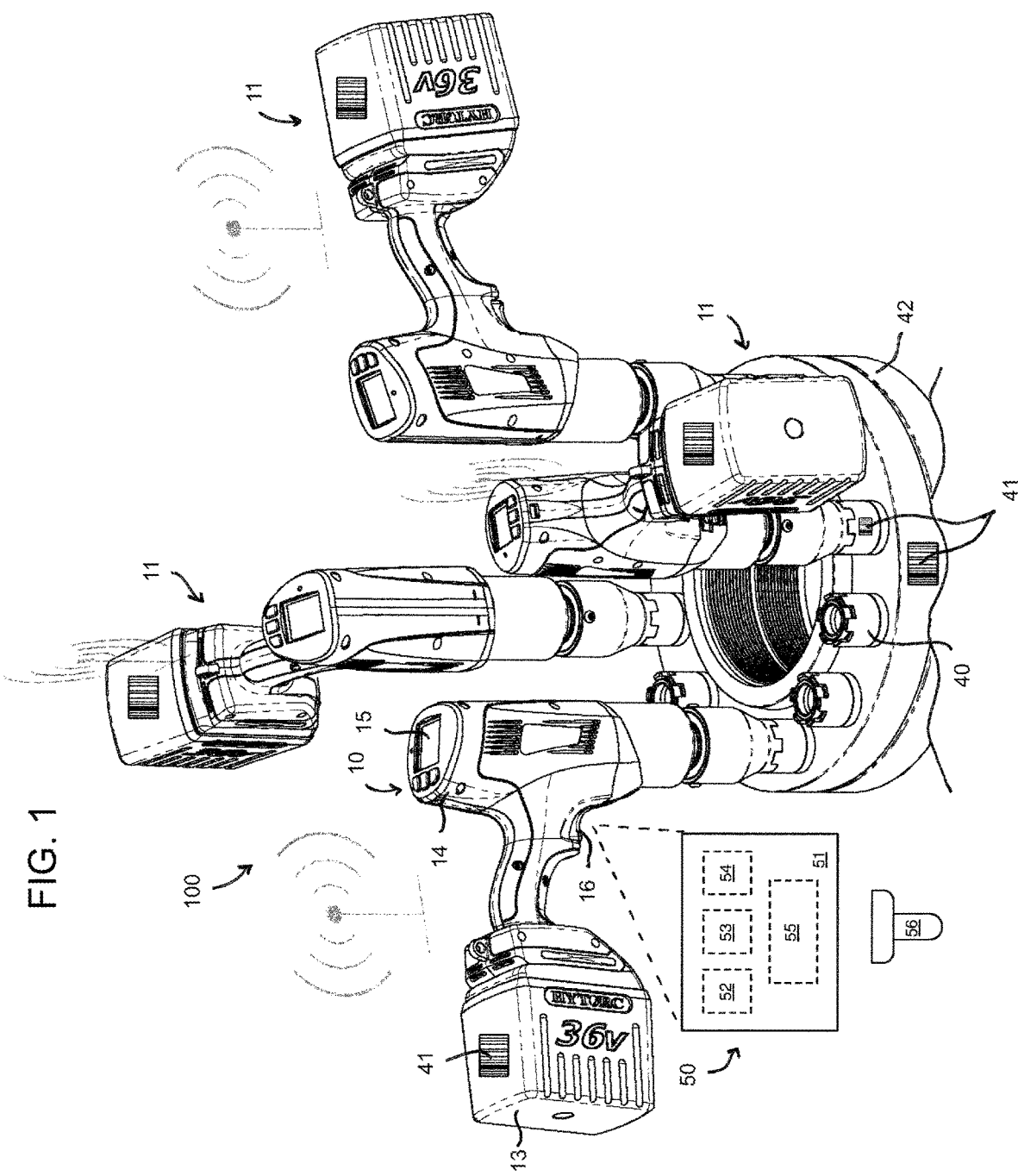

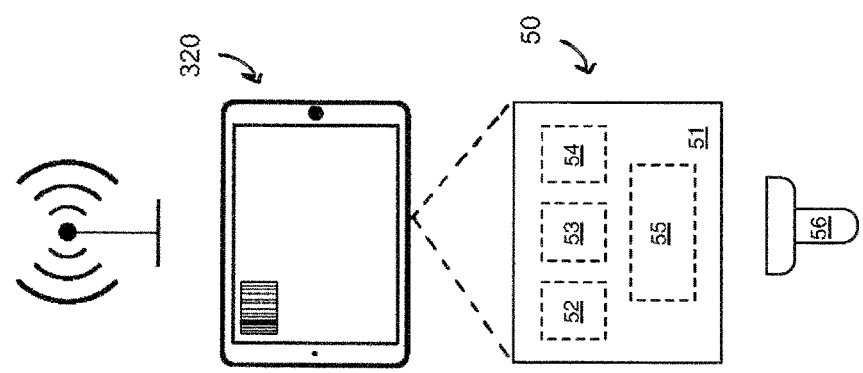
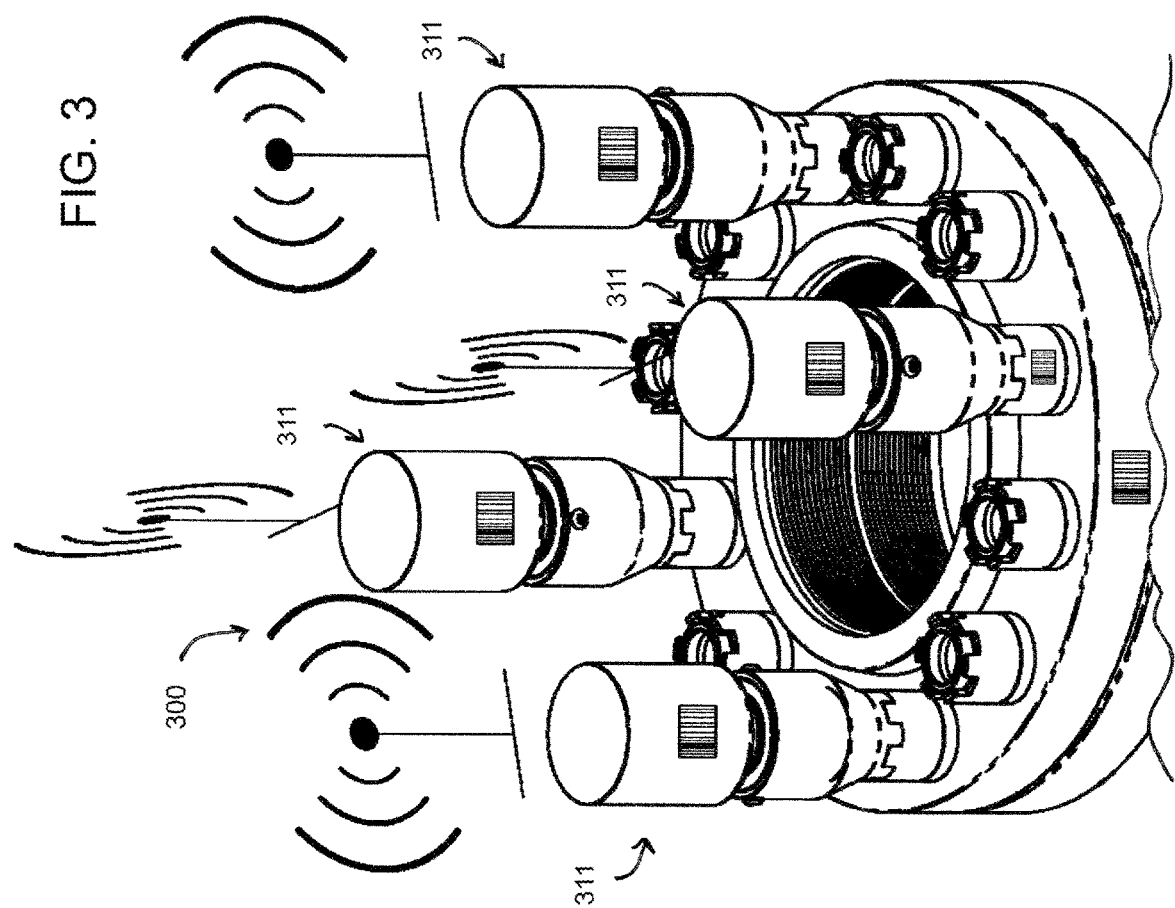
FIG. 3

APPARATUS FOR TIGHTENING THREADED FASTENERS

CROSS REFERENCE TO RELATED APPLICATION(S)

This application either claims priority to and/or is either a continuation patent application or a continuation-in-part application of the following commonly owned and/or patent applications, entire copies of which are incorporated herein by reference: U.S. Application Ser. No. 62/626,776, having Filing Date of 6 Feb. 2018, entitled "APPARATUS FOR TIGHTENING THREADED FASTENERS"; and International Application Serial No. PCT/US17/20498, having Filing Date of 2 Mar. 2017, entitled "APPARATUS FOR TIGHTENING THREADED FASTENERS".

BACKGROUND

Electric torque wrenches include a planetary torque multiplier or gearbox, with multiplication ratios, mated to an electric motor. At the end of the gearbox is a reaction device that is used to absorb the torque. The correct torque output is adjusted via the operation unit by controlling, for example, an electrical input. In this example, upon reaching the correct torque output the electric motor is shut off according to the level that is adjusted by the operator of the tool. Such operation units for controlling electric torque wrenches are sufficiently known from the state of the art.

Known operation units have embodiments which absolve the operating personnel from the responsibility of deciding whether the screwing process was performed properly. However, it is still required that the operating personnel first set the setting parameters in the prescribed manner so that the target parameters or values to be achieved can be achieved. The setting parameters thereby conform to a plurality of screw connection process parameters, which result for example from the operator, the application or screw connection, and the tool in use. Known sources of errors, which lead to a defective screw connection, are for example: incorrect selection of tools; incorrect use of calculation tables; basic calculation errors in the determination of setting parameters; incorrect assignment of screw parameters to the screw connection; incorrect bolt elongation; failure of the tool or its components; failure of measuring means; incorrect setting of the setting parameters; etc.

These types of issues have been addressed in drive units for driving fluid power operated tools for the generation of a screw pretensioning force, which include for example hydraulically operated torque or other wrenches or expanding cylinders. In PCT/US10/56683, an entire copy of which is incorporated herein by reference, Applicant provided a drive unit that eliminates the risk of an incorrect setting of the setting parameter. Other control and management units and systems for power operated tools have been disclosed by Applicant in PCT/US10/32139, PCT/US09/48395 and PCT/US12/38402, entire copies of which are incorporated herein by reference.

What is needed is improved industrial bolting systems.

DESCRIPTION

The present invention relates to an operation parameter regulation unit for use with a bolting system having a plurality of networked electrically powered torque tools and/or drive portions of torque tools for simultaneous tightening of industrial threaded fasteners, the operation parameter regulation unit including:
  a processing unit;
  an output unit connected and/or integrated with the processing unit;
  an input unit connected and/or integrated with the processing unit;
  an activation unit connected and/or integrated with the processing unit for activating operation units of the plurality of networked electrically powered torque tools and/or drive portions of torque tools; and
  a control unit for controlling operation parameters of each of the plurality of networked electrically powered torque tools and/or drive portions of torque tools to maintain a difference between the operation parameters within a predetermined value.

Innovations disclosed in this application advance such drive unit and control unit technology and solve the object through an operation parameter regulation unit for use with a bolting system having a plurality of networked electrically powered torque tools and/or drive portions of torque tools for simultaneous tightening of industrial threaded fasteners with the characteristics of claim 1. Electrically powered torque tools including such operation parameter regulation unit are disclosed. Industrial bolting systems for simultaneous tightening of industrial threaded fasteners are also disclosed, including either: such operation parameter regulation units; a plurality of networked electrically powered torque tools controlled by such an electrically powered torque tool; a plurality of networked electrically powered drive portions of torque tools controlled by such electrically powered torque tool; or any combination thereof. Advantageous embodiments of the invention are listed in the dependent claims.

Advantageously, innovations disclosed in this application include operation parameter regulation units for bolting systems having a plurality of networked electrically powered torque tools and/or drive portions of torque tools for simultaneous tightening of industrial threaded fasteners. Indeed SIMULTORC® is achievable with a plurality of networked electrically powered torque tools and/or drive portions of torque tools, particularly those of the handheld and/or mobile variety. SIMULTORC® is a proprietary bolting method of Applicant, to ensure Parallel Joint Closure® and joint integrity, which minimizes risk of operator injury, property damage and/or production loss by joint leakage, joint failure and/or crushing a gasket buffering closure of a flange.

Characteristic of the operation parameter regulation unit according to the invention is that it has a processing unit with an output unit as well as a data capturing unit connected and/or integrated with the processing unit, wherein the processing unit is designed for the output of the value to be set on the operation parameter regulation unit based on fastener connection process parameters determined with the data capturing unit. The data capturing unit of the operation parameter regulation unit according to the invention makes it possible to automatically capture fastener connection process parameters without requiring input from the operating personnel. The fastener connection process parameters include for example data on the operating personnel, data on the tool to be used, e.g. the used electric torque wrench or other tool, data on the fastener connection to be established, information on the fastener connection means and data on the structural elements to be fastened together. The saving of the corresponding fastener connection process parameters in a form in which they can be automatically imported by the data capturing unit permits the error-free capturing of all fastener connection process parameters required for the determination of the setting parameters, based on which the processing unit determines the setting parameters, insofar as they are not saved or do not already result directly from the imported data. The specification, input and/or use of incorrect setting parameters, which could result from incorrect inputs by operating personnel, is prevented by automated data capturing. The setting parameters determined by the processing unit are specified without error via the output unit of the processing unit, so that only a transfer of the specified setting parameters is required. The work process can then be started via activation of the activation, or power, unit via the operation unit of the tool and/or drive portion of the tool and can be ended again after the target values have been reached.

An activation unit connected and/or integrated with the processing unit activates operation units of the plurality of networked electrically powered torque tools and/or drive portions of torque tools. A control unit controls operation parameters of each of the plurality of networked electrically powered torque tools and/or drive portions of torque tools to maintain a difference between the operation parameters within a predetermined value. Note that a plurality of activation units may be connected and/or integrated with the processing unit to activate operation units of the plurality of networked electrically powered torque tools and/or drive portions of torque tools.

The operation parameters include: tool electrical circuit parameters including current, voltage and/or magnetic field; tool torque output values; fastener rotation speeds; fastener pretensioning force; fastener rotation angle; fastener elongation; fastener and/or tool torsion, whether axial or housing flex; reaction fixture side load; fastener frictional resistance; bolting application separation (gap) distance; and/or any combination thereof. The operation parameters may be directly and/or indirectly measured or sensed by various types of sensor units: strain gauges; rotary encoders; torque sensors and transducers; hall effect and similar magnetic and ferromagnetic field sensing units; clutches; load cells; position meters/sensors; gap sensors; etc. Note that other components known in the art may be used.

During a SIMULTORC® operation if the difference in the operation parameters of the plurality of networked electrically powered torque tools and/or drive portions of torque tools exceeds the predetermined value the control unit regulates the operation parameters of each tool and/or drive portion until the difference in operation parameter(s) returns to within the predetermined value. The control unit either: ceases operation parameter(s) of tool(s) and/or drive portions with increased operation parameter(s); lowers operation parameter(s) of tool(s) and/or drive portions with increased operation parameter(s); raises operation parameter(s) of tool(s) and/or drive portions with decreased operation parameter(s); or performs any one or more of such actions to any one or more such tool(s) and/or drive portions either causally, simultaneously and/or in predetermined order. Note that automatic executing systems and/or computer programs, which are e.g. integrated into the processing unit and that independently start the bolting process and end it after the target values have been reached, can also be used cooperatively and/or separately to perform bolting process(es) of the present invention.

The balancing of the automatically captured specific process parameters to be performed by the processing unit can generally take place in any manner, wherein for example the data required for determining the setting parameters are already saved in the processing unit. However, in accordance with an advantageous further embodiment of the invention, the processing unit is designed for connection with a storage unit. This embodiment of the invention makes it possible to selectively provide the processing unit with the information necessary for determining the required setting parameters via the storage unit. In the case of this further embodiment of the invention, the saving of the relevant data required for determining the setting parameters in the processing unit can be omitted so that it can be designed particularly cost-effectively.

The connection to a storage unit also enables in a simple manner access to current data so that an otherwise potentially complicated updating of the processing unit can be omitted.

The connection option to the storage unit also makes it possible to save process-specific information, e.g. data on the performed bolting processes, on the storage unit. A manual, potentially defective and time- and cost-intensive documentation of the performed bolting processes can be omitted in this case. The establishment of a connection of the processing unit with the storage unit can thereby take place in any form, wherein for example a standardized connection arranged on the processing unit, e.g. a USB connection, enables in a simple manner the connection of the storage unit to the processing unit.

However, according to a particularly advantageous embodiment of the invention, the processing unit is designed for wireless connection with the storage unit. The wireless connection, which can in particular be established via standardized radio protocols, enables a particularly simple and comfortable connection of the processing unit with the storage unit. They can be equipped for example with a GSM module, a Bluetooth module or the like. Note that any suitable means of wireless connection between the processing unit and the storage unit may be used including: Satellite, WI-FI, WiMAX, Bluetooth, ZigBee, Microwave, Infrared, Radio, and/or proximity sensor. This embodiment of the invention also makes it possible to access a central storage unit, e.g. a central database, with correspondingly designed drive units, so that local storage units are not needed. The use of a central database facilitates data management in a special manner since updates only need to be made in one database. Moreover, the wireless connection to the central storage unit makes it possible to save information on the performed bolting processes centrally so that information can be queried from the central database by authorized persons, similar to the tracking of product shipments.

For the determination of setting parameters, it is required that the fastener connection process parameters are saved in a manner comprehendible by the data capturing unit at a suitable location, e.g. in the operation parameter regulation unit itself, in one or more of the plurality of networked electrically powered torque tools and/or drive portions of torque tools, or the fastener connection. The fastener connection process parameters may include, e.g. the operating personnel identification; information about one or more of the plurality of networked electrically powered torque tools and/or drive portions of torque tools which includes e.g. information on the manufacturer, type, size, serial number, characteristics; data on the fastener connection instances can be type, application, description of the fastener connection type, fastener connection parameters (e.g. torque, pretensioning force, rotation angle, elongation, torsion, side load, or frictional resistance, etc.); data on the equipment of the fastener connection which includes e.g. manufacturer, thread, dimensions and yield points); and data on the fastener connection instance, or bolting application; etc. Note that fastener connection process parameters may include other relevant characteristics, data and/or information. These fastener connection process parameters are saved in a manner comprehendible by the data capturing unit on the individual elements. The type of the data saving in a manner comprehendible by the data capturing unit is thereby generally freely selectable. Since e.g. barcodes or RFID units have particularly proven themselves as machine-readable codes, the data capturing unit is designed as a mobile code reader unit and/or RFID receiver and/or write unit according to a particularly advantageous embodiment of the invention. Such data capturing units are characterized by their high reliability and cost-effective design. If applicable, the respective information is saved in a form corresponding to the data capturing units, i.e. in accordance with this advantageous embodiment as machine-readable code or on an RFID unit, so that it can be captured immediately. Note that the data capturing unit may be designed as any suitable means, such as, for example, a mobile code reading device, RFID receiver and/or write unit, etc.

The use of RFID units is thereby characterized in particular in that the capturing can take place in wireless form and over a greater distance, wherein the use of RFID units also makes it possible to save supplementary data on the RFID unit after completion of the bolting processes. Machine-readable code is thereby understood in particular as barcodes or the like, wherein the read devices then have corresponding scanners. The barcodes can be arranged on stickers, which are e.g. attached to the tool and/or the fastener connection.

The connection of the data capturing unit with the processing unit can also generally take place in any manner. However, according to a particularly advantageous embodiment of the invention, the data capturing unit is designed for wireless connection with the processing unit. A corresponding design of the invention, in which the connection is established e.g. via standardized radio procedures, increases ease of use in a supplementary manner since there is no restriction for data capturing via data capturing units due to a cable-bound connection.

The design of the operation parameter regulation unit for determining the setting parameter(s) and/or the operation parameter(s) to be applied by the power unit(s) of each of the plurality of networked electrically powered torque tool(s) and/or drive portion(s) of torque tool(s), e.g. for the establishment of a uniform pretensioning force, to achieve SIMULTORC®, can generally take place in any manner. However, according to a particularly advantageous embodiment of the invention, the operation parameter regulation unit is designed as having e.g. a keypad panel, touch screen, mobile device, etc., for controlling or regulating the target values of the setting parameter(s) and/or the operation parameter(s). Recall that controlling or regulating of the operation parameters (e.g. tool electrical circuit parameters including current, voltage and/or magnetic field; tool torque output values; fastener rotation speeds; fastener pretensioning force; fastener rotation angle; fastener elongation; fastener and/or tool torsion, whether axial or housing flex; reaction fixture side load; fastener frictional resistance; bolting application separation (gap) distance; and/or any combination thereof) is required to ensure Parallel Joint Closure® and joint integrity for the fastener connection. The operation parameter regulation unit can thereby be set in any manner, in the easiest manner automatically or manually, to the target value(s) specified on the output unit. The start of the bolting process can then take place via activation of the activation unit of the operation parameter regulation unit for activating operation units of the plurality of networked electrically powered torque tools and/or drive portions of torque tools.

Note that the operation parameter regulation unit is designed for wireless connection with the plurality of networked electrically powered torque tools and/or drive portions of torque tools by any suitable means including Satellite, WI-FI, WiMAX, Bluetooth, ZigBee, Microwave, Infrared, Radio, and/or proximity sensor.

In addition to a purely optical output of the setting parameters via the output unit, it is provided according to a further embodiment of the invention, that the output unit is designed for assistance in control and/or regulation of the operation parameter regulation unit. In accordance with this embodiment of the invention, the setting parameter determined by the processing unit is automatically transferred to the operation parameter regulation unit, e.g. an electrically controllable operation parameter regulation unit, after determination of the process parameters via the data capturing unit. This embodiment of the invention guarantees in a supplementary manner that a misadjustment caused by operating personnel and thus a defective screw connection does not result. In a particularly advantageous manner, the output unit is also designed to assist the control unit to check the setting parameters and to make corrections. This ensures in a particularly reliable manner an error-free establishment of the required fastener connections.

The documentation of the performed work processes can generally take place in any manner, for example as listed above, by saving information on a storage unit. However, according to a particularly advantageous embodiment of the invention, the output unit has a printing apparatus, which makes it possible to make available to operating personnel immediately in printed form reports on the realized fastener connections. Alternatively or additionally, it can also be provided according to a further development of the invention that the processing unit is designed for the documentation of the realized fastener connections. Should it be required to procure information on the realized fastener connections, the processing unit can be accessed at a later time and the data saved there can be called.

In accordance with a particularly advantageous embodiment of the invention, the operation parameter regulation unit and/or the processing unit has a time and/or position capturing unit attached and/or integrated with each of the plurality of networked electrically powered torque tools and/or drive portions of torque tools. This data, wherein the position capturing unit can be formed e.g. by a GPS receiver, can also be saved as information on the realized processes so that the quality of the realized and callable documentation can be increased in a supplementary manner. Furthermore, automation enhancements applied to such position capturing units, operation parameter regulation units and/or each of the plurality of networked electrically powered torque tools and/or drive portions of torque tools having such regulation units, such as drone flight capabilities, allow for remote, unsupervised and/or automatic performance of bolting operations.

SIMULTORC® operations are further improved with such automation enhancements because each of the plurality of networked electrically powered torque tools and/or drive portions of torque tools are available to automatically move to locations exhibiting atypical bolting characteristics. Proximity sensors may be used for improved location guidance of tools to the fasteners. Additional fastener connection process parameters would be needed for such an automation enhancement, such as, for example: interactive moving maps; bolting route guidance; fastener approach guidance; dynamic route editing with wind correction, speed, distance, headings and power consumption computation; bolting application elevation and orientation profiles; surroundings/terrain awareness in 2D and 3D; support for internal gyros or external AHRS boxes; displays of speed, altitude, course, etc.; live flight tracking; weight and balance computations; automatic recordation of bolting connections logbook; tool and tool portion movement synchronization; etc.

Further disclosed inventions include: an electrically powered torque tool including such operation parameter regulation unit; a mobile device including such operation parameter regulation unit; and industrial bolting system for simultaneous tightening of industrial threaded fasteners including such operation parameter regulation unit.

Exemplary embodiments of the invention are explained in more detail below with reference to the drawings. Previous discussion applies to the drawings. For ease of explanation tool torque output value(s) is the operation parameter of choice, but any disclosed operation parameter and may be used including: tool electrical circuit parameters including current, voltage and/or magnetic field; tool torque output values; fastener rotation speeds; fastener pretensioning force; fastener rotation angle; fastener elongation; fastener and/or tool torsion, whether axial or housing flex; reaction fixture side load; fastener frictional resistance; and/or any combination thereof.

Referring to FIG. 1, it shows a perspective representation as a sketch of an industrial bolting system 100 for simultaneous tightening of industrial threaded fasteners 40 including a plurality of networked electrically powered torque tools 11 controlled by an electrically powered torque tool 10 having an operation parameter regulation unit 50. Tool 10 acts as the master and networked tools 11 act as the slaves in this embodiment. For ease of explanation, operation parameter regulation unit 50 is shown exterior to tool 10 enclosed within a cover 51, however in practice the whole of unit 50 and/or parts thereof are formed within or adjacent tool 10. Tool 10 receives power via an electrical power supply 13, preferably in the form of an on-board lithium ion battery. Power supply 13 may include any suitable source (e.g., solar cell, fuel cell, electrical wall socket, generator, motor, etc.). Generally, operation parameter regulation unit 50, activates an electronic power unit 14 of tool 10 and controls the torque output level (or other operation or setting parameter) set on an operation unit 15. Electronic power unit 14 and operation unit 15 are shown separate from each other and external from operation parameter regulation unit 50. Electronic power unit 14 and/or operation unit 15, however, may be formed as a single unit and/or may be formed integral with or adjacent operation parameter regulation unit 50.

Operation parameter regulation unit 50, in this case, regulates/monitors/measures etc. torque output of tool 10 and tools 11, as the target value. In order to set the target value required for a fastener connection, operation parameter regulation unit 50 has an input unit 52. A data capturing unit 56, in this case a mobile barcode scanner, captures fastener connection process parameters 41 from the operating personnel, tool 10 and/or tools 11, a fastener connection instance, or bolting application, 42 and fastener connection equipment 40. Bolting application 42 may include, for example, a flange to be closed. Fastener connection equipment 40 may include, for example, threaded studs, bolts and/or nuts, washers and/or any other suitable items.

Data capturing unit 56 is shown external to operation parameter regulation unit 50, however the whole of unit 56 or parts thereof may be found within tool 10 or operation parameter regulation unit 50. Fastener connection process parameters 41 are transferred wirelessly to a processing unit 53. Processing unit 53 indicates the compression torque to be set via the display, or output, unit 51, which may be formed as or part of an operating panel 15 on tool 10 after accessing the data, perhaps saved on a storage unit (not shown). After setting the shown compression torque on input unit 52 either manually, semi-manually or automatically, the fastening process can be started and stopped via an activation unit 55, either manually, semi-manually or automatically. If manually, activation unit 55 may be formed as a trigger 16 of tool 10, which the operator pulls to start the fastening process. Note that the compression torque or the screw pretensioning force is the force necessary to tighten and/or loosen the screw connection. Note that each of tool 10 and/or tools 11 may be structurally similar to each other containing similar components such that embedded software commands in operation parameter regulation unit 50 perform a minority, majority and/or all of the steps of the SIMULTORC® bolting operations disclosed.

Note that each of the plurality of networked electrically powered torque tool(s) 10 and/or 11 are arranged equally distantly from one another on threaded fasteners 40 around fastener connection instance, or bolting application, 42. SIMULTORC® is the proprietary bolting method of Applicant to ensure Parallel Joint Closure® and joint integrity, which minimizes risk of operator injury, property damage and/or production loss by joint leakage, joint failure and/or crushing a gasket (not shown) buffering closure of bolting application 42. Note that a sensing unit (not shown) may be included with operation parameter regulation unit 50 and/or tool 10 and/or tools 11 to determine when the plurality of networked electrically powered torque tools 10 and 11 are available to tighten and/or loosen threaded fasteners 40. In other words, electronic power unit(s) 14, operation unit(s) 15, trigger(s) 16, operation parameter regulation unit(s) 50, and/or parts thereof, may not be activatable unless tool 10 and/or tools 11 are correctly positioned about and safely engaged with threaded fasteners 40 and bolting application 42. Such a sensing unit acts as a safety mechanism to reduce and/or eliminate risk of operator injury and a quality mechanism to ensure Parallel Joint Closure® and joint integrity.

During a SIMULTORC® bolting operation, as shown, for example, in FIG. 1, a control unit 54 controls operation parameter(s), in this case tool torque output value(s), of each of the plurality of networked electrically powered torque tools 10 and/or 11 to maintain a difference between the operation parameter(s) within a predetermined value. If the difference in the operation parameter(s) exceeds the predetermined value, control unit 54 regulates the operation parameter(s) of tools 10 and/or 11 until the difference in operation parameter(s) returns to within the predetermined value.

Figure 2:
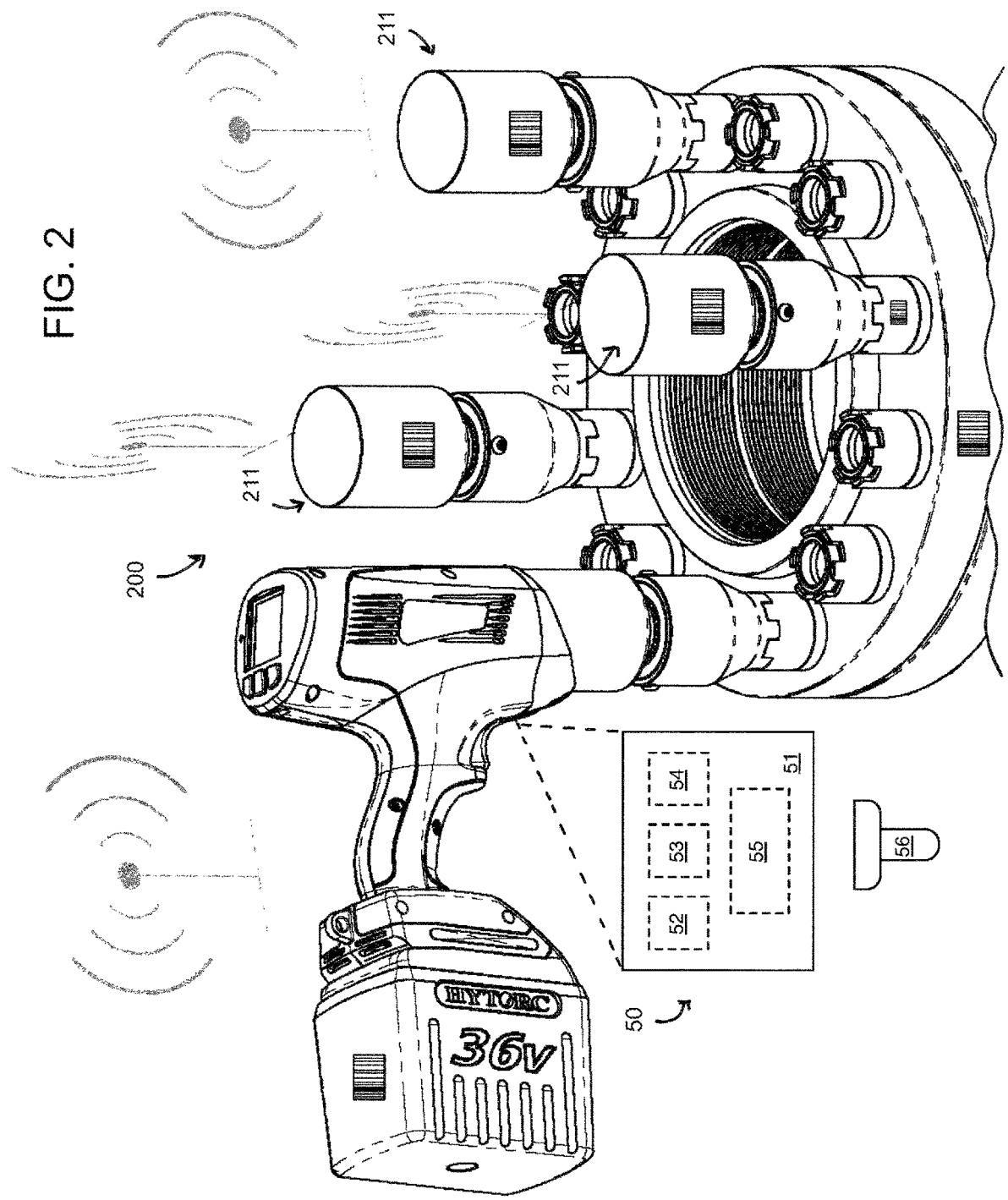

Another exemplary embodiment of the invention is explained in more detail below with reference to FIG. 2. Previous general discussion and specific discussion related to FIG. 1 applies to embodiment shown in FIG. 2. Referring to FIG. 2, it shows a perspective representation as a sketch of an industrial bolting system 200 for simultaneous tightening of industrial threaded fasteners 40 including a plurality of networked drive portions of electrically powered torque tools 211 controlled by electrically powered torque tool 10 having operation parameter regulation unit 50. Tool 10 acts as the master and networked drive portions 211 act as the slaves in this embodiment.

Another exemplary embodiment of the invention is explained in more detail below with reference to FIG. 3. Previous general discussion and specific discussion related to FIGS. 1 and 2 applies to embodiment shown in FIG. 3. Referring to FIG. 3, it shows a perspective representation as a sketch of an industrial bolting system 300 for simultaneous tightening of industrial threaded fasteners 40 including a plurality of networked drive portions of electrically powered torque tools 311 controlled by a mobile device 320 having operation parameter regulation unit 50. Mobile device 320 acts as the master and networked drive portions 311 act as the slaves in this embodiment.

Figure 4:
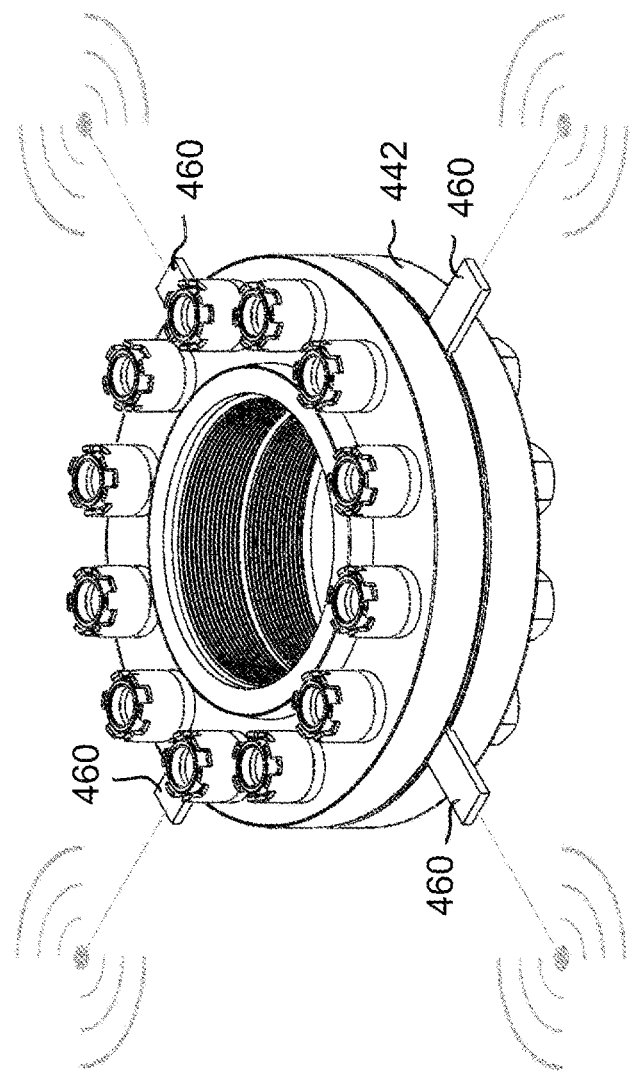

Another exemplary embodiment of the invention is explained in more detail below with reference to FIG. 4. Previous general discussion and specific discussion related to FIGS. 1, 2 and 3 applies to embodiment shown in FIG. 4. A fastener connection instance, or bolting application, 442 is usable with industrial bolting systems 100, 200, 300 and/or variants thereof. Bolting application separation (gap) sensors 460 are arranged equally distantly from one another near the corresponding threaded fasteners. Bolting application separation (gap) sensors 460 measure the relative distance between the two parts of the joint to be closed. During a SIMULTORC® bolting operation, as shown, for example, in FIG. 1, control unit 54 controls operation parameter(s), in this case bolting application separation (gap) distance, of each of the bolting application separation (gap) sensors 460 to maintain a difference between the operation parameter(s) within a predetermined value. If the difference in the operation parameter(s) exceeds the predetermined value, control unit 54 regulates the operation parameter(s) of tools 10 and/or 11 (and/or 211/311) until the difference in operation parameter(s) returns to within the predetermined value. As shown, gap sensors 460 are networked sensor wands. Note that any suitable gap (or displacement) sensor may be used including 1D or 2D, thru beam/reflective, laser, eddy current, ultrasonic, contact-type, inductive, capacitive, magnetic, optical, fiber, spring, etc. sensors.

Figure 5:
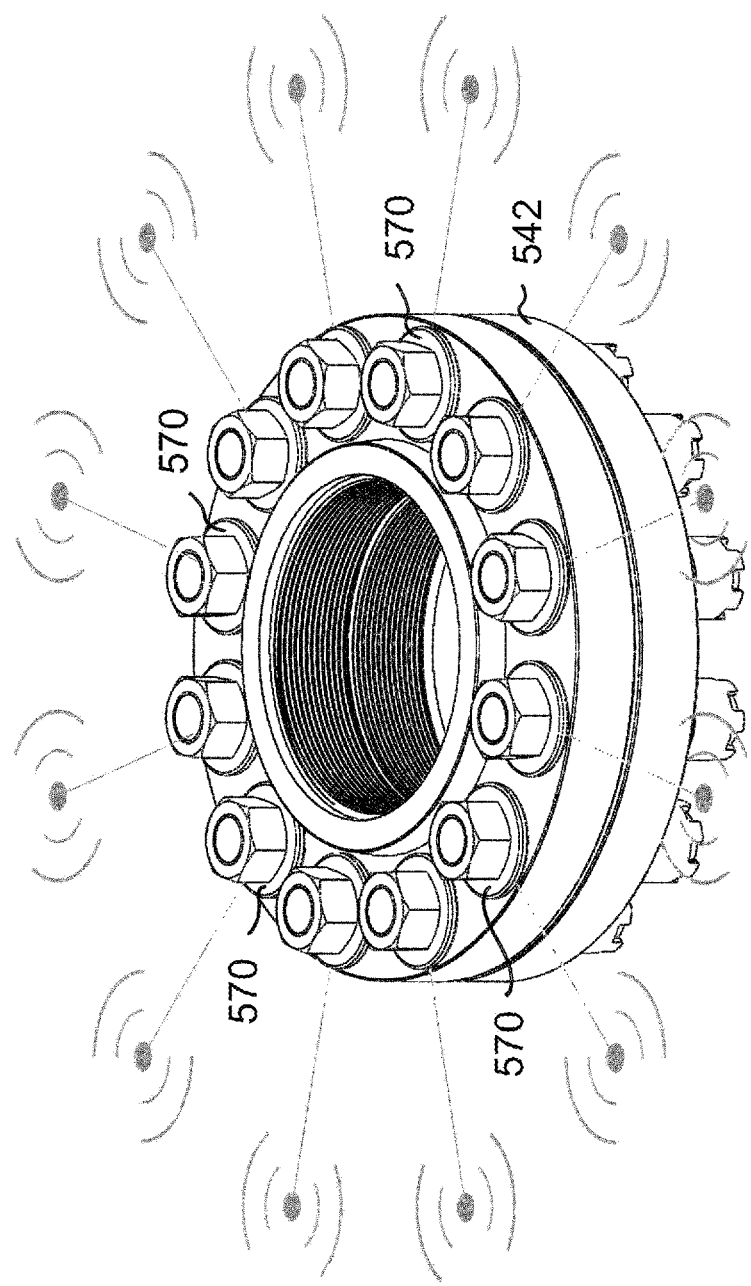

Another exemplary embodiment of the invention is explained in more detail below with reference to FIG. 5. Previous general discussion and specific discussion related to FIGS. 1, 2, 3 and 4 applies to embodiment shown in FIG. 5. A fastener connection instance, or bolting application, 542 is usable with industrial bolting systems 100, 200, 300 and/or variants thereof. Bolting application fastener load cells 570 are arranged adjacent a plurality of threaded fasteners. Bolting application fastener load cells 570 are shown adjacent and measure the tension in each fastener. During a SIMULTORC® bolting operation, as shown, for example, in FIG. 1, control unit 54 controls operation parameter(s), in this case fastener tension values, of each of then actively engaged fasteners and load cells 570 to maintain a difference between the operation parameter(s) within a predetermined value. If the difference in the operation parameter(s) exceeds the predetermined value, control unit 54 regulates the operation parameter(s) of tools 10 and/or 11 (and/or 211/311) until the difference in operation parameter(s) returns to within the predetermined value. Note that any suitable load cell may be used including strain gauge, piezoelectric, hydraulic, pneumatic, vibratory, capacitive, etc. load cells.

In an alternative embodiment not shown in the drawings, monitoring and controlling of: electrically powered torque tool 10; plurality of networked electrically powered torque tools 11; plurality of networked drive portions of electrically powered torque tools 211; plurality of networked drive portions of electrically powered torque tools 311; one thereof; a plurality thereof; one subset thereof; a plurality of subsets thereof; or any combination thereof, can occur as part of a cell, line, plant-wide, entity-wide or collaboration-wide manufacturing execution system (MES). In other words, torque tools and drive portions of torque tools of the present invention are intelligent devices that can be integrated with other devices and equipment, in manual, automated or semi-automated processes, to combine all aspects of manufacturing, to digitize all processes and records, and to tightly control all output of operations.

In a further embodiment not shown in the drawings, monitoring and controlling of: electrically powered torque tool 10; plurality of networked electrically powered torque tools 11; plurality of networked drive portions of electrically powered torque tools 211; plurality of networked drive portions of electrically powered torque tools 311; one thereof; a plurality thereof; one subset thereof; a plurality of subsets thereof; or any combination thereof, can occur in a closed-loop, wired system, especially in critical bolting applications.

Advantageously, innovations disclosed in this application include operation parameter regulation units for bolting systems having a plurality of networked electrically powered torque tools and/or drive portions of torque tools for simultaneous tightening of industrial threaded fasteners. Indeed SIMULTORC® is achievable with a plurality of networked electrically powered torque tools and/or drive portions of torque tools, particularly those of the handheld and/or mobile variety. SIMULTORC® is a proprietary bolting method of Applicant, to ensure Parallel Joint Closure® and joint integrity, which minimizes risk of operator injury, property damage and/or production loss by joint leakage, joint failure and/or crushing a gasket buffering closure of a flange.

When used in the foregoing specification, and/or the following claims, the terms "comprises", "includes", "has" and variations thereof mean that the specified features, steps or integers are included. The terms are not to be interpreted to exclude the presence of other features, steps or components. Few if any of the terms or phrases in the specification and claims have been given any special meaning different from their plain language meaning, and therefore the specification is not to be used to define terms in an unduly narrow sense.

The features disclosed in the foregoing specification, the following claims, and/or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof. It is to be understood that the above is merely a description of preferred embodiments of the present application and that various changes, combinations, alterations, and variations may be made without departing from the true spirit and scope of the invention as set for in the appended claims.

What is claimed is:

1. An operation parameter regulation unit for use with a bolting system having a plurality of networked electrically powered torque tools and/or drive portions of torque tools for simultaneous tightening of industrial threaded fasteners, the operation parameter regulation unit including:
   a processing unit;
   an output unit connected and/or integrated with the processing unit;
   an input unit connected and/or integrated with the processing unit;

an activation unit connected and/or integrated with the processing unit for activating operation units of the plurality of networked electrically powered torque tools and/or drive portions of torque tools;

a control unit for controlling operation parameters of each of the plurality of networked electrically powered torque tools and/or drive portions of torque tools to maintain a difference between the operation parameters within a predetermined value; and one or more sensor units including bolting application separation (gap) sensors for direct and/or indirect measurement of the operation parameters of either: the plurality of networked electrically powered torque tools and/or drive portions of torque tools; the plurality of parts of a joint to be closed; or the plurality of networked threaded fasteners.

2. An operation parameter regulation unit according to any preceding claim wherein the operation parameters include either: tool electrical circuit parameters including current, voltage and/or magnetic field; tool torque output values; fastener rotation speeds; fastener pretensioning force; fastener rotation angle; fastener elongation; fastener and/or tool torsion; reaction fixture side load; fastener frictional resistance; and/or any combination thereof.

3. An operation parameter regulation unit according to any preceding claim wherein during operation if the difference in the operation parameters of the plurality of networked electrically powered torque tools and/or drive portions of torque tools exceeds the predetermined value the control unit regulates the operation parameters of each tool and/or drive portion until the difference in operation parameter(s) returns to within the predetermined value by either:

ceasing operation parameter(s) of tool(s) and/or drive portions with increased operation parameter(s);

lowering operation parameter(s) of tool(s) and/or drive portions with increased operation parameter(s);

raising operation parameter(s) of tool(s) and/or drive portions with decreased operation parameter(s); or performing any one or more of such actions to any one or more such tool(s) and/or drive portions either causally, simultaneously and/or in predetermined order.

4. An operation parameter regulation unit according to any preceding claim, including a data capturing unit connected and/or integrated with the processing unit, wherein the processing unit is designed for the output of the value to be set on the operation parameter regulation unit based on fastener connection process parameters determined with the data capturing unit.

5. An operation parameter regulation unit according to claim 4, characterized in that the data capturing unit is designed as a mobile code reading device and/or RFID receiver and/or write unit.

6. An operation parameter regulation unit according to any preceding claim including a storage unit.

7. An operation parameter regulation unit according to any preceding claim designed for wireless connection with the plurality of networked electrically powered torque tools and/or drive portions of torque tools by any suitable means including Satellite, WI-FI, WiMAX, Bluetooth, ZigBee, Microwave, Infrared, and/or Radio.

8. An operation parameter regulation unit according to claim 1 wherein the one or more sensor units further include bolting application fastener load cells.

9. An operation parameter regulation unit according to any preceding claim, characterized in that the data capturing unit is designed for wireless connection with the processing unit.

10. An operation parameter regulation unit according to any preceding claim designed for the documentation of realized bolting connections.

11. An operation parameter regulation unit according to claim 4, characterized in that the fastener connection process parameters are determined from an operating personnel, a power operated tool, a fastener connection instance and fastener connection equipment.

12. An electrically powered torque tool including an operation parameter regulation unit according to any preceding claim.

13. An electrically powered torque tool according to claim 12 of the handheld and/or mobile variety.

14. An industrial bolting system for simultaneous tightening of industrial threaded fasteners including an operation parameter regulation unit according to either claim 1, 2, 3, 4, 5, 6, 7, 8, 9, 10 or 11.

15. An industrial bolting system according to claim 14 including a plurality of networked electrically powered torque tools and/or drive portions of torque tools controlled by an electrically powered torque tool according to either claim 12-13.

16. An industrial bolting system according to claim 14 including a plurality of networked drive portions of electrically powered torque tools controlled by an electrically powered torque tool according to either claim 12-13.

17. An industrial bolting system according to claim 14 wherein the operation parameter regulation unit is formed within a mobile device, the industrial bolting system including either:

a plurality of networked electrically powered torque tools;

a plurality of networked electrically powered drive portions of torque tools; or any combination thereof.

18. An industrial bolting system according to either claim 14-17 wherein the networked electrically powered torque tools and/or the networked electrically powered drive portions of torque tools of the handheld and/or mobile variety.

19. An industrial bolting system according to either claim 14-18 wherein the operation parameter regulation unit automatically controls the plurality of networked electrically powered torque tools and/or drive portions of torque tools.

20. An industrial bolting system according to either claim 14-18 wherein the activation unit of at least one of the plurality of networked electrically powered torque tools and/or drive portions of torque tools is formed as a trigger which is manually controlled by an operator.

21. An industrial bolting system according to either claim 14-20 to achieve simultaneous torque application to ensure parallel joint closure and joint integrity which minimizes risk of operator injury, property damage and/or production loss by joint leakage, joint failure and/or crushing a gasket buffering closure of a flange.

22. An industrial bolting system according to either claim 14-21 wherein each of the plurality of networked electrically powered torque tools and/or drive portions of torque tools are arranged equally distantly from one another on threaded fasteners around the fastener connection instance.

23. An industrial bolting system according to either claim 14-22 wherein the plurality of networked electrically powered torque tools and/or drive portions of torque tools includes time and/or position capturing unit(s).

24. An industrial bolting system according to claim 23 wherein the time and/or position capturing unit(s) include automation enhancements such as drone flight capabilities.

25. An industrial bolting system according to either claim 14-24 including a sensing unit which determines when the plurality of networked electrically powered torque tools and/or drive portions of torque tools are available to tighten and/or loosen the threaded fasteners thereby rendering the operation unit activatable.

26. A method of automatically controlling an industrial bolting system according to either claim 14-25 including maintaining a difference between operation parameters of each of the plurality of networked electrically powered torque tools and/or drive portions of torque tools within a predetermined value.

27. A method according to claim 26 including arranging each of the plurality of networked electrically powered torque tools and/or drive portions of torque tools equally distantly from one another on threaded fasteners around the fastener connection instance.

28. A method according to claim 26 wherein each of the plurality of networked electrically powered torque tools and/or drive portions of torque tools include time and/or position capturing unit(s) having automation enhancements such as drone flight capabilities.

\* \* \* \* \*